United States Patent [19]

Katayama et al.

[11] Patent Number: 5,093,821
[45] Date of Patent: Mar. 3, 1992

[54] OPTICAL PICKUP APPARATUS USING PLURAL LASER SOURCES OF DIFFERENT WAVELENGTHS

[75] Inventors: Hiroshi Katayama; Michiaki Sato, both of Higashihiroshima, Japan

[73] Assignee: Sharp Kabushiki Kaisha, Osaka, Japan

[21] Appl. No.: 441,535

[22] Filed: Nov. 27, 1989

[30] Foreign Application Priority Data

Dec. 9, 1988 [JP] Japan .............................. 63-312392

[51] Int. Cl.⁵ .............................................. G11B 7/00
[52] U.S. Cl. ..................................................... 369/112
[58] Field of Search ............................ 365/215, 234; 369/44.37, 44.38, 44.24, 44.41, 44.42, 94, 95, 112, 120, 121, 122

[56] References Cited

U.S. PATENT DOCUMENTS

| | | | |
|---|---|---|---|
| 4,090,031 | 5/1978 | Russell | 369/94 |
| 4,680,745 | 7/1987 | Ota et al. | 369/44.38 |
| 4,888,755 | 12/1989 | Itoh | 369/112 |

*Primary Examiner*—Donald McElheny, Jr.

[57] ABSTRACT

An optical pickup apparatus having plural light sources which emit laser lights of different wavelengths, a first optical system section for converging and irradiating as light spots the emitted laser lights on a recording medium, a second optical system section for leading the reflected lights on a single optical path of the laser lights, a focusing lens for converging the reflected lights in different focuses according to their respective wavelengths on a single optical axis.

8 Claims, 2 Drawing Sheets

OPTICAL PICKUP APPARATUS USING PLURAL LASER SOURCES OF DIFFERENT WAVELENGTHS

FIELD OF THE INVENTION

The present invention relates to an optical pickup apparatus attached to a device which records, reproduces, and erases information optically by irradiating laser lights to a recording medium.

BACKGROUND OF THE INVENTION

A conventional optical pickup apparatus usually effectuates the recording, the reproduction, the erasing and the like, of information by a single laser light source. However, the above apparatus presents the disadvantage that when recording or reproducing information, the processing time for writing or reading successively information on a recording medium through the use of a single light spot is generally long.

Some of the recent optical pickup apparatuses, in order to shorten the information processing time, are provided with plural sources of laser lights of different wavelengths of oscillation and plural light receiving elements. In such an apparatus, the recording, the reproduction and the like of signals is effectuated simultaneously at different locations on one and same recording medium. Namely, the laser lights emitted from the different laser light sources are irradiated simultaneously on one and same recording medium at different locations, then the different light receiving elements detect simultaneously the reflected lights of the laser lights on the recording medium.

An example of this type of optical pickup apparatus is illustrated in FIG. 4. In this optical pickup apparatus, the laser light 29a emitted from the laser light source 21a in the center-right part of the figure, is transformed into a parallel pencil of rays by a collimating lens 22a, transmitted through a polarized beam splitter 23a, converged by an objective lens 24a, and irradiated as light spot 28a on a recording medium 20 formed in the shape of a disk. The reflected light 29a' of the laser light 29a on the recording medium 20, is transformed into a parallel pencil of rays by the objective lens 24a then reflected at right angles toward a prism 25 by the polarized beam splitter 23a.

Similarly, the laser light 29b emitted from the laser light source 21b in the center-left part of the figure, is irradiated as light spot 28b to the recording medium 20 across the collimating lens 22b, the polarized beam splitter 23b and the objective lens 24b. The reflected light 29b' of the laser light 29b on the recording medium 20, is reflected across the objective lens 24b by the polarized beam splitter 23b toward the prism 25 in the same optical path as the reflected light 29a' corresponding to the laser light source 21a mentioned above.

Meanwhile, the above-mentioned sources of laser light 21a and 21b are arranged such that they generate laser lights of which wavelengths are mutually different, for example a laser light 29a of a long wavelength, and a laser light 29b of a short wavelength. The wavelengths of the reflected lights 29a' and 29b' are mutually different as they correspond respectively to the wavelengths of the laser lights 29a and 29b therefore, the deflection angles on the prism 25 of the reflected lights 29a' and 29b' are different. Accordingly, the deflection angle of the reflected light 29a', corresponding to the laser light 29a of for example a long wavelength (hereinafter referred to as long wavelength reflected light 29a'), is smaller than the deflection angle of the reflected light 29b' corresponding to the laser light 29b of a short wavelength (hereinafter referred to as short wavelength reflected light 29b'). Thereby the long wavelength reflected light 29a' is converged by the focusing lens 26 toward the light receiving element 27a. Meanwhile, as its deflection angle is bigger than the deflection angle of the long wavelength reflected light 29a', the short wavelength reflected light 29b' is converged by the focusing lens 26 toward the light receiving element 27b.

In an arrangement such as mentioned above, as the recording, the reproduction and the like is effectuated simultaneously at different locations on the recording medium 20, the processing time is shorten by half, compared with the optical pickup apparatus with a single laser light source mentioned earlier, and a plurality of informations can be processed at great speed.

However, in the optical pickup apparatus arranged as mentioned above, the members composing the optical system section which processes the reflected lights 29a' and 29b' after they are reflected by the polarized beam splitters 23a and 23b, need to be installed in accordance with the deflection angle at the prism 25. Therefore the miniaturization of the apparatus used to be difficult.

Hence, there is known, as an improvement to compensate for the disadvantage mentioned above, an optical pickup apparatus which, as illustrated in FIG. 5, uses instead of the prism 25 a focusing lens 36 having a property such that the index of refraction varies according to the wavelength of the incident light (wavelength dispersion function). The arrangement leading the reflected lights 39a' and 39b' to the focusing lens 36 is omitted in FIG. 5 as it is the same as in the above-mentioned FIG. 4.

In the optical pickup apparatus provided with an optical system section as shown in FIG. 5, when the reflected lights of different wavelengths proceeding in one and same optical path, for example a long wavelength reflected light 39a' and a short wavelength reflected light 39b', are incident on the focusing lens 36, the focus 40a of the reflected light 39a' and the focus 40b of the reflected light 39b' are focused on the same optical axis at different positions.

For example, the focus 40a of the long wavelength reflected light 39a' is focused farther from the focusing lens 36 on the optical axis than the focus 40b of the short wavelength reflected light 39b'.

The photo-detector 37 is mounted in the neighborhood of, for example like in the present embodiment, the focus 40a of the long wavelength reflected light 39a', which is the farther among the focuses 40a and 40b of the reflected lights 39a' and 39b' from the focusing lens 36.

As a result, the reflected light 39a' is converged in the neighborhood of the photo-detector 37 in a circle of a small diameter and the reflected light 39b', after being converged into focus 40b spreads into a circle of a big diameter in the neighborhood of the photo-detector 37. The above-mentioned photo-detector 37 is composed of a small diameter light receiving element 41 which light receiving face is formed in the shape of a circle of a small diameter, and a big diameter light receiving element 42 which light receiving face is formed in the shape of a ring within which inner diameter is mounted the light receiving face of the small diameter light receiving element 41 in a concentric manner.

Accordingly, the reflected light 39a' converged in a circle of a small diameter is detected by the small diameter light receiving element 41, and the reflected light 39b' spread into a circle of a big diameter is detected by the big diameter light receiving element 42.

In such an arrangement, the prism 25 mentioned earlier becomes unnecessary, and the optical path on and after the polarized beam splitters 23a and 23b can be formed in a straight line. Thereby, the miniaturization of the optical pickup apparatus is facilitated.

However, in the conventional optical pickup apparatus mentioned above, as the small diameter light receiving element 41 mounted in the photo-detector 37 is irradiated simultaneously by the reflected light 39b', spread in a circle of a big diameter, and by the reflected light 39a' converged in a circle of a small diameter, the reflected light 39b' though slightly, contaminates the reflected light 39a'. And as a result the conventional optical pickup apparatus mentioned above used to present the problem that the detection signal detected by the small diameter light receiving element used to contain noise (crosstalk).

SUMMARY OF THE INVENTION

It is an object of the present invention to provide an optical pickup apparatus capable of effectuating simultaneously the recording, the reproduction and the like of a plurality of informations by irradiating to one and same recording medium plural laser lights of different wavelengths.

It is another object of the present invention to produce an optical pickup apparatus capable of improving the S/N of the reproduction signals by detecting independently through different light receiving elements each of the reflected lights of the plural laser lights reflected on the recording medium.

It is a further object of the present invention to produce an optical pickup apparatus more miniaturized.

In order to achieve the above objects, the optical pickup apparatus in accordance with the present invention is characterized in comprising:

plural emission means for emitting laser lights of different wavelengths;

a first optical system section for converging and irradiating as a light spot each emitted laser light to a recording medium;

a second optical system section for leading the reflected lights of each laser light reflected on the recording medium mentioned above in one and same optical path;

focusing means for converging in different focuses on one and same optical axis the reflected lights according to their respective wavelengths;

luminous intensity attenuating means installed on the optical axis between the above optical system sections and the above focusing means; and photo-detector means for detecting the reflected lights converged in different focuses on one and same optical axis by the focusing means, installed in the neighborhood of the focus farthest from the focusing means among the different focuses of the reflected lights, and provided with plural light receiving elements which light receiving faces are installed on one and same plane and formed in concentric circles of different diameters.

According to the arrangement mentioned above, the laser lights of different wavelengths emitted from plural emission means are converged and irradiated as light spots by the first optical system section on the recording medium, then reflected on the recording medium. Those reflected lights are led by the second optical system outside the optical path from the light source to the recording medium, into one and same optical path. And thereafter the central section of the pencil of rays formed by those reflected lights is attenuated or shaded by the luminous intensity attenuating means. Then, the pencil of rays is converged by the focusing means according to the difference of wavelengths into separate different focuses on one and same optical axis. For example, the reflected lights corresponding to the laser lights of long wavelengths (hereinafter referred to as long wavelength reflected lights) are converged in different focuses far from the focusing means. The longer the wavelength of the reflected light is, the farther from the focusing means the focus of the reflected light is. The reflected lights corresponding to the laser lights of short wavelengths (hereinafter referred to as short wavelength reflected lights) are converged in different focuses close to the focusing means. The shorter the wavelength of the reflected light is, the closer from the focusing means the focus of the reflected light is.

Moreover the photo-detector means is installed in the neighborhood of the focus farthest from the focusing means among the different focuses of the reflected lights, that is, in the neighborhood of the focus of the reflected light of the longest wavelength.

As each reflected light is attenuated or shaded in the central section of its optical path by the luminous intensity attenuating means, the reflected lights other than the reflected light of the longest wavelength are converged by the focusing means and irradiated spread into the shape of a ring on the photo-detector means which is installed in the neighborhood of the focus of the reflected light of the longest wavelength. On the other hand, the reflected light of the longest wavelength is converged at a location corresponding to the position of the photo-detector and is irradiated.

As a result, in the photo-detector mentioned above, the reflected light of the longest reflected light alone is converged independently on the light receiving element provided with the light receiving face of the smallest diameter among the plural light receiving elements which light receiving faces are mounted in the same plane and which are formed in concentric circles of different diameters. Also, the short wavelength reflected lights spread in a ring shape are irradiated on different light receiving elements of big diameters. As the shorter the wavelength of the short wavelength reflected light is, the bigger the ring it becomes is, the light receiving elements of big diameters formed in concentric circles are able to receive reflected lights which are totally separated.

Hence, the optical pickup apparatus, as well as being able to effectuate simultaneously the recording, the reproduction and the like, of a plurality of informations by irradiating plural laser lights of different wavelengths on one and same recording medium, can be formed in a straight line from the second optical system section on to the photo-detector means and thus is miniaturized.

Moreover, the photo-detector provided to the optical pickup apparatus is capable of detecting independently the reflected lights corresponding to the laser lights of different wavelengths, thus the crosstalk is reduced and thereby the S/N of the reproduction signals is improved.

For a fuller understanding of the nature and advantages of the invention, reference should be made to the ensuing detailed description taken in conjunction with the accompanying drawings.

BRIEF DESCRIPTION OF THE DRAWINGS

The FIGS. 1 to 3 show an embodiment of the present invention.

DETAILED DESCRIPTION OF THE EMBODIMENTS

Figure 2:
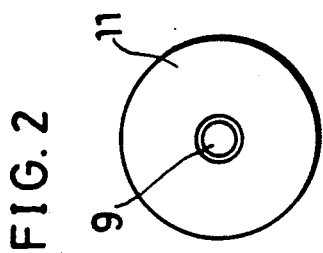
FIG. 2 is a front view of the light receiving elements shown in FIG. 1.
Figure 3:
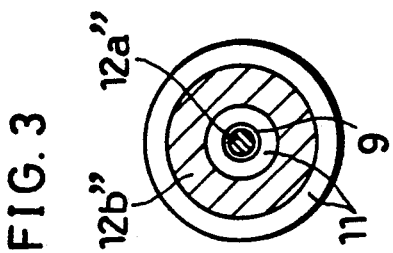
FIG. 3 is a front view illustrating the focus state of the laser lights on the light receiving elements.
Figure 1:
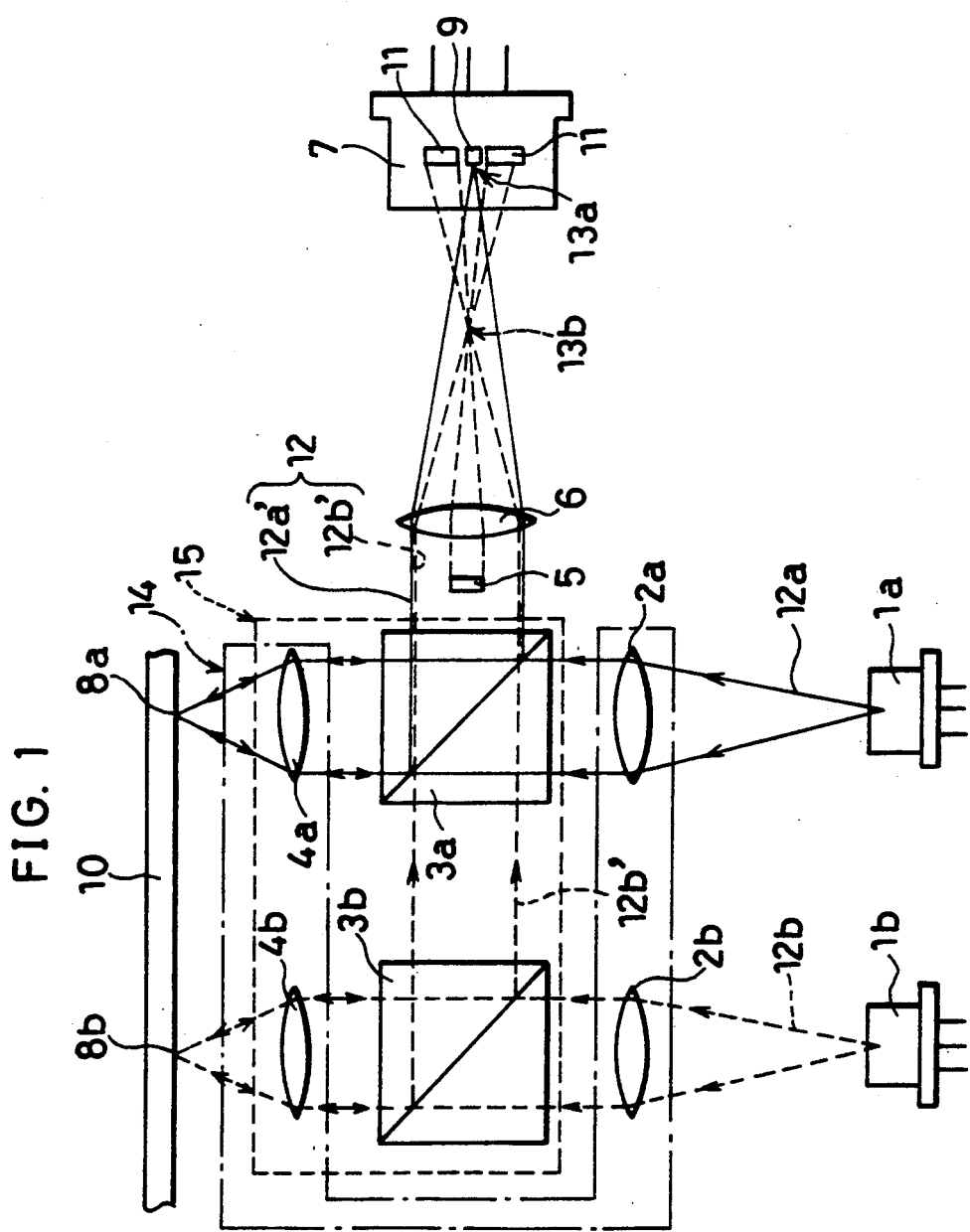
FIG. 1 is a view illustrating the composition of the optical pickup apparatus.
Figure 4:
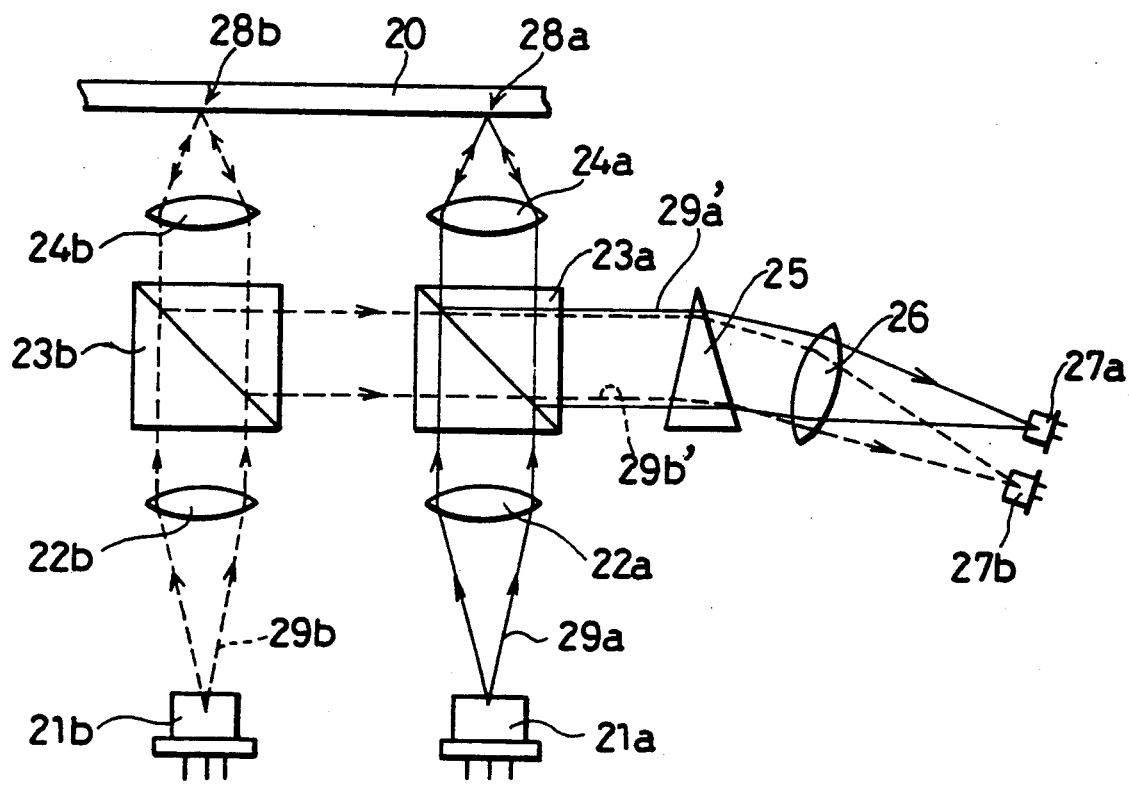
FIG. 4 is a view illustrating the composition of a conventional optical pickup apparatus.
Figure 5:
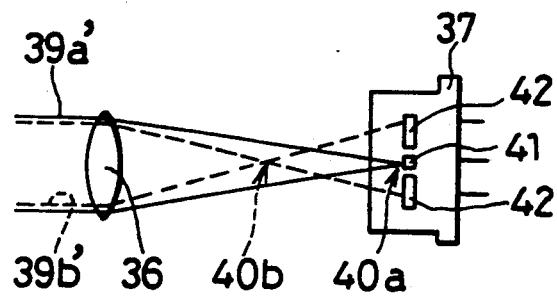
FIG. 5 is a view illustrating the composition of the essential parts of another conventional optical pickup apparatus.

The following description will discuss an embodiment of the present invention with reference to FIGS. 1 to 3.

In the optical pickup apparatus in accordance with the present invention there is installed, as shown in FIG. 1, between the laser light source 1a, as emission means for emitting the laser light 12a, and the recording medium 10 from the laser light source 1a side on in succession, a collimating lens 2a which transforms the laser light 12a into a parallel pencil of rays, a polarized beam splitter 3a which reflects at right angles the reflected light 12a' which was reflected on the recording medium, and an objective lens 4a which converges and irradiates as light spot 8a the laser light 12a to the recording medium 10 and also which transforms the reflected light 12a' into a parallel pencil of rays.

On the other hand, beside the above-mentioned laser source 1a is juxtaposed a laser light source 1b as emission means for emitting a laser light 12b of a wavelength different, for example shorter, from the wavelength of the laser light 12a emitted by the laser light source 1a. Between this laser light source 1b and the recording medium 10 there is also installed similarly from the laser light source 1b side on, a collimating lens 2b, a polarized beam splitter 3b and an objective lens 4b. The reflected light 12b' which is reflected by the above-mentioned polarized beam splitter 3b, is led in the same optical path as the reflected light 12a', which is reflected by the polarized beam splitter 3a mentioned earlier.

The first optical system section 14, which converges and irradiates as spots 8a and 8b the laser lights 12a and 12b emitted from the light sources 1a and 1b on the recording medium 10, is composed of the collimating lens 2a, the collimating lens 2b, the objective lens 4a and the objective lens 4b. The second optical system section 15 which leads on one and same optical path the reflected lights 12a' and 12b', reflected on the recording medium 10 from the laser lights 12a and 12b, is composed of the objective lens 4a, the objective lens 4b, the polarized beam splitter 3a and the polarized beam splitter 3b.

The optical path in which the reflected lights 12a' and 12b' are led by the second optical system section 15 is one and same and the focusing lens 6 as focusing means is installed on this one and same optical path.

The shade 5, as luminous intensity attenuating means, is installed on the optical axis between the optical system 15 and the focusing lens 6. The photo-detector 7, as photo-detector means, is installed in the neighborhood of the focus the farther from the focusing lens among the focuses 13a and 13b of the reflected lights 12a' and 12b' converged by the focusing lens 6, for example the focus 13a. This photo-detector is composed, as shown in FIG. 2, of a small diameter light receiving element 9, which light receiving face is formed in the shape of a circle of a small diameter, and a big diameter light receiving element 11 which light receiving face is formed in the shape of a ring and in which inner diameter is mounted in a concentric manner the light receiving face of the light receiving element 9. The outer diameter and inner diameter of the light receiving face of the light receiving element 11 correspond virtually, as described later, to the outer diameter and inner diameter of the spreading of the reflected light 12b' irradiated on the photo-detector 7 spread in a ring shape.

In the arrangement mentioned above, the laser light 12a of for example a long wavelength, is transformed into a parallel pencil of rays by the collimating lens 2a in the first optical system section 14, is transmitted through the polarized beam splitter 3a of the second optical system section 15, and is converged and irradiated as light spot 8a by the objective lens 4a on the disk shaped recording medium 10. The reflected light 12a', reflected on the recording medium 10 is transformed into a parallel pencil of rays by the objective lens 4a in the second optical system section 15, and reflected at right angles toward the focusing lens 6 by the polarized beam splitter 3a.

On the other hand, the laser light 12b of for example a short wavelength emitted by the laser source 1b is similarly converged and irradiated by the first optical system section 14 as spot light 8b on the recording medium 10. Then, the reflected light 12b', which was reflected on the recording medium 10, is similarly reflected in the second optical system section 15 at right angles toward the focusing lens 6, is furthermore transmitted through the polarized beam splitter 3a, and is led in the same optical path as the reflected light 12a' mentioned above. These reflected lights 12a' and 12b' which are led in one and same optical path, form the pencil of rays 12.

As the shade 5 is installed on the optical axis of the pencil of rays 12 between the second optical system section 15 and the focusing lens 6, the pencil of rays 12 reaches the focusing lens 6 shaded by the shade 5 in its central section. The focusing lens 6 mentioned above converges the reflected lights 12a' and 12b' according to their respective wavelengths into different focuses 13a and 13b on one and same optical axis. For example, the reflected light 12a' of the laser light 12a of a long wavelength (hereinafter referred to as long wavelength reflected light 12a') is converged in a focus 13a, far from the focusing lens 6. And the reflected light 12b' of the laser light 12b of a short wavelength (hereinafter referred to as short wavelength reflected light 12b') is converged in a focus 13b close to the focusing lens 6. As the photo-detector 7 is installed in the neighborhood of the focus 13a far from the focusing lens 6, the long wavelength reflected light 12a' is converged, as shown in the shadowed portion of FIG. 3, as a circle of a small diameter 12a'' on the small diameter light receiving element installed in the photo-detector 7.

Moreover, as the central section of the pencil of rays 12 is shaded by the shade 5, the short wavelength reflected light 12b', after being converged in focus 13b, spreads into a ring and is irradiated as ring 12b'' on the big diameter light receiving element 11, as shown in the shaded portion of FIG. 3.

Accordingly, the contamination by the reflected light 12b' on the small diameter light receiving element 9 is suppressed, and the small diameter light receiving element 9 is able to detect independently the reflected light 12a' alone. In other words, the reflected lights 12a' and 12b', comprised in the pencil of rays 12, are received in a completely separated condition by the small diameter light receiving element 9 and the big diameter light receiving element 11 mounted in the photo-detector 7, converted into an electric signal varying according to the amount of light received, and thereby the recording information is reproduced.

The optical pickup apparatus in accordance with the present invention is, as described above, characterized in comprising:

plural emission means for emitting laser lights of different wavelengths;

a first optical system section for converging and irradiating on a recording medium as light spot each emitted laser light;

a second optical system section for leading in one and same optical path the reflected lights of the laser lights reflected on the recording medium mentioned above;

focusing means for converging the reflected lights according to their respective wavelengths in different focuses on one and same optical axis;

luminous intensity attenuating means installed on the optical axis between the above-mentioned optical system sections and the above-mentioned focusing means; and photo-detector means for detecting the reflected lights converged by the above-mentioned focusing means in different focuses on one and same optical axis, installed in the neighborhood of the focus the farthest among the different focuses of each reflected lights from the focusing means, and provided with plural light receiving elements which light receiving faces are mounted on one and same plane and which are formed in concentric circles of different diameters.

Moreover, in the optical pickup apparatus mentioned above, a shade is used as luminous intensity attenuating means but members, like for instance a filter or the like, which attenuate the intensity of the optical path central section of the pencil of rays when this pencil of rays formed of plural reflected lights is transmitted, may also be used.

Consequently, the optical pickup apparatus in accordance with the present invention is capable of effectuating simultaneously the recording, the reproduction and the like of a plurality of informations by irradiating on one and same recording medium plural laser lights of different wavelengths. As it can be formed in a straight line from the second optical system on to the photo-detector means, the apparatus is miniaturized. Furthermore, the crosstalk occurring because mingled reflected lights are received on one and same light receiving element, is reduced and thus the S/N improved.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical pickup apparatus composed of:
   plural emission means for emitting laser lights of different wavelengths;
   a first optical system section for converging and irradiating as a light spot said emitted laser lights on a recording medium;
   a second optical system section for leading in one and same optical path the reflected lights reflected on said recording medium from said laser lights; focusing means for converging in different focuses on one and same optical axis said reflected lights according to their respective wavelengths;
   luminous intensity attenuating means installed on said optical axis between said optical system sections and said focusing means; and
   photo-detector means for detecting said reflected lights converged by said focusing means in said different focuses on said one and same optical axis, installed in the neighborhood of the focus farthest from said focusing means among said different focuses of said reflected lights, and provided with plural light receiving elements which light receiving faces are installed in one and same plane and which are formed in concentric circles of different diameters.

2. The optical pickup apparatus as defined in claim 1 wherein said first optical system section is installed in accordance with said different wavelengths of said laser lights, and comprises collimating lenses which transform said laser lights into a parallel pencil of rays and objective lenses which converge and irradiate said laser lights on said recording medium.

3. The optical pickup apparatus as defined in claim 1 wherein said second optical system section is installed in accordance with said different wavelengths of said laser lights, and comprises objective lenses which transform into a parallel pencil of rays said reflected lights of said laser lights on said recording medium and polarized beam splitters which reflect at right angles and leads into one and same optical path said reflected lights transformed into said parallel pencil of rays.

4. The optical pickup apparatus as defined in claim 1 wherein said focusing means comprises a focusing lens which converges according to the wavelengths in different focuses on one and same optical axis the pencil of rays formed by said plural reflected lights of said different wavelengths.

5. The optical pickup apparatus as defined in claim 1 wherein said luminous intensity attenuating means comprises a shade which shades the central section of the pencil of rays formed by said plural reflected lights of different wavelengths.

6. The optical pickup apparatus as defined in claim 1 wherein said luminous intensity attenuating means comprises a filter or the like which shades the intensity in the central section of the optical path of the pencil of rays when said pencil of rays formed of said plural reflected lights of different wavelengths is transmitted therethrough.

7. The optical pickup apparatus as defined in claim 1 wherein said photo-detector means comprises a small diameter light receiving element which light receiving face is formed in the shape of a circle of a small diameter, and big diameter light receiving elements which light receiving faces are formed in the shape of a ring within which inner diameter are mounted in a concentric manner the light receiving faces of the smaller diameter light receiving faces.

8. The optical pickup apparatus as defined in claim 7 wherein the outer and inner diameters of said big diameter light receiving elements are set substantially in accordance with the outer and inner diameters of the spread of the reflected lights among the reflected lights from said laser lights of different wavelengths emitted by said plural emission means on said recording medium which, after said luminous intensity attenuating means attenuated the intensity of the central section of said optical path, are converged in focuses between said focusing means and said photo-detector means, and irradiated on said photo-detector means spread in a ring shape.

* * * * *